Patented July 3, 1945

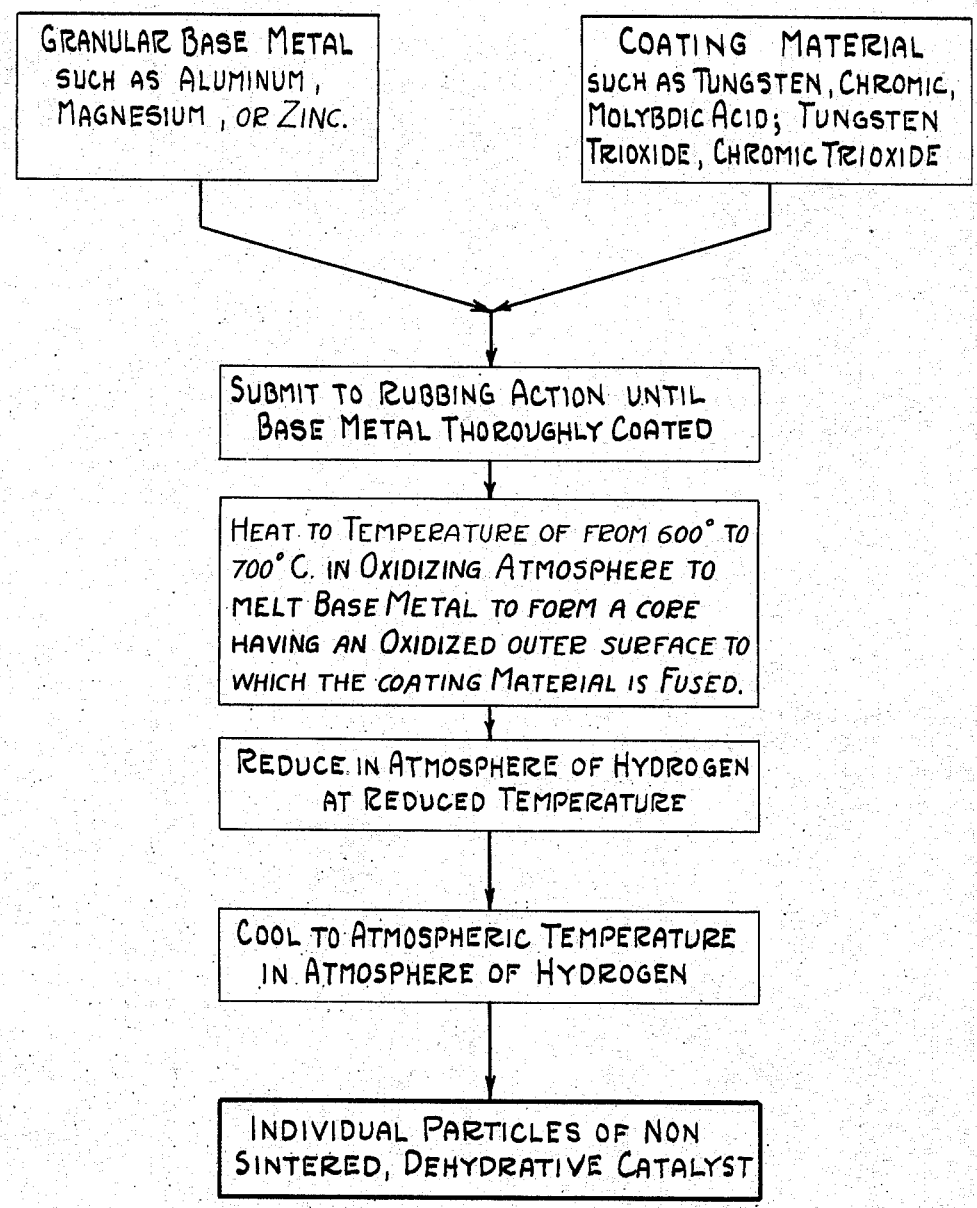

2,379,736

UNITED STATES PATENT OFFICE 2,379,736

METHOD OF MAKING A CATALYST AND RESULTING PRODUCT

Harry Miller, Vandalia, Mo., assignor to National Agrol Company, Inc., New York, N. Y., a corporation of Delaware.

Application November 6, 1939, Serial No. 303,168

6 Claims. (Cl. 252—213)

This invention relates to a catalyst, and more particularly to a method of making a catalyst and the resulting product.

One of the objects of my invention is to provide a method of forming a catalyst by coating particles of a selected base metal with its own oxide and incorporating a specific acidic metallic oxide of strong dehydrative properties as a promotive agent.

A further object of my invention is to provide a composite catalyst having markedly strong dehydrative properties.

The single sheet of drawings discloses a flow sheet illustrative of one form of my invention.

With these and other objects in view, my invention embraces broadly the concept of preparing a catalyst having strong dehydrative properties by applying to oxides of certain metals of the second and third groups of the periodic system of the elements a thin coating of promotive acid metallic oxides of family A of the sixth group of the periodic system, reduced in situ. Both classes of metals are characterized by their lowermost positions on the descending arms of atomic volume curve of the elements.

This particular type of catalyst is looked upon as made up of a freshly deposited coating of the promotive oxide from metal of the sixth group of the periodic system deposited upon a metallic oxide freshly prepared in situ from metals of the second and third group of the periodic system and in an atmosphere containing oxygen, all of which is followed by activation of mixed catalytic mass by reduction in current of hydrogen.

In general the preparation of this activated dehydrative catalyst embodies the employment of a granular metal such as aluminum, zinc and magnesium, in contact with approximately 5 to 20% its weight of tungstic acid, chromic acid or molybdic acid and the entire mass well triturated; after that it is heated to approximately 600–700° C. or just under that point of endangering the reduction of acidic oxide into its metal. The mass is then cooled to a temperature of about 300° C. when a current of hydrogen is made to effect a reduction of acidic oxide. If desired, the material may be allowed to cool in a dry atmosphere to atmospheric temperature between the heating and the reducing steps, and separate apparatus for these steps may therefore be employed.

The catalytic mass formed by the process consists of non-sintered individual particles having exceedingly strong dehydrative properties. These particles pour freely and do not lose their original shape. Their interiors consist of a free metal with its corresponding oxide under a thin coating of a promotive oxide. For example, where aluminum has been used as the base metal and tungstic acid as the coating material, the core of the particle is metallic aluminum with an aluminum oxide outer surface in which is embedded the blue oxide of tungsten ($W_2O_5$ ) and probably some aluminum tungstate.

The particular feature which distinguishes this new type of dehydrative catalyst from others heretofore known is the presence of a metallic core capable of serving as a reduction reserve for the promotive agent, thus maintaining the latter in a state of highest possible activity and thereby contributing to the masking of any dehydrogenative characteristics likely to be displayed by the basic metallic oxides present. A definite and stable equilibrium between the component parts of this improved catalytic mass is indicated by the absence of caking, disintegration and sintering through many hours of its continuous service.

The catalyst produced by the described process has strong dehydrative properties which are effective from room temperature to approximately 600° C. and are especially effective from approximately 100° to 400° C. By the use of this catalyst under proper conditions, the elements of water are removed from a large variety of compounds such as esters, alcohols, ethers and acids.

The following example discloses the proportions of materials which can be used if aluminum is selected as the base metal and tungstic acid is used as the coating material. In this connection it should be noted that, although aluminum oxide, and blue tungstic oxide ($W_2O_5$ ) by themselves and in physical mixtures have dehydrative properties, when they are combined in the manner described in this example these properties are tremendously enhanced.

Example

To granular metallic aluminum of from ten to thirty mesh, add approximately ten percent tungstic acid and subject the mixture to a rubbing action such as is produced with a mortar and pestle until all the aluminum particles are covered with the coating material. Continue rubbing until the particles turn bluish in color. Heat to about 650° C. in an atmosphere containing oxygen, then cool to about 300° C. and subject pellets to reducing action of a stream of hydrogen until tungstic oxide is reduced to ($W_2O_5$ ), as evidenced by appearance of deep blue color.

Finally, cool and preserve in atmosphere of hydrogen.

In direct comparison with $Al_2O_3$, $W_2O_5$ and mixtures of these oxides, the catalyst herein described in example dehydrates ethyl alcohol into ethylene and water as shown in the following table:

Temperature 300° C.

Distillation rate equivalent in all cases, based upon use of one gram of catalyst.

| Catalyst | Rate of dehydration. Ethylene evolved in 5 min. |
|---|---|
| | Cc. |
| $Al_2O_3$ | 40 |
| $(W_2O_5\pm)$ | 190 |
| 50% $Al_2O_3$—50% $(W_2O_5\pm)$ (mixture) | 205 |
| Al, $Al_2O_3$, $(W_2O_5\pm)$ pellet | 250 |

While for purposes of illustration I have given a specific example of the use of aluminum as a base metal and tungstic acid as the coating material, it is obvious that the method may be adapted to the use of the other compounds mentioned in this application, or their equivalents. In the claims, the term "base metal" is limited to aluminum, magnesium and zinc, and their chemical equivalents. It is believed apparent that many alterations may be made in the process of preparing this catalyst without departing from the spirit and scope of this invention.

I claim:

1. A method of forming a dehydrative catalyst comprising mixing a base metal selected from the group consisting of aluminum, magnesium and zinc, in major proportions sufficient to form a core, with a higher oxide selected from the elements of family A of the sixth group of the periodic system, heating the mixture in an oxidizing atmosphere to a temperature within the range of from 600 to 700° C. to melt the base metal and oxidize its outer surface without sintering the selected oxide, and then reducing the selected oxide to a lower oxide in an atmosphere of a suitable reducing agent.

2. A method of forming a dehydrative catalyst composed of non-sintered particles comprising mixing aluminum of small mesh in major proportions sufficient to form a core, with a higher oxide selected from the elements of family A of the sixth group of the periodic system, heating the mixture in an oxidizing atmosphere to a temperature within the range of from 600 to 700° C. to melt the aluminum and oxidize its outer surface without sintering the selected oxide, and then reducing the selected oxide to a lower oxide in an atmosphere of a suitable reducing agent.

3. A method of forming a dehydrative catalyst of non-sintered particles comprising mixing aluminum of small mesh, in major proportions sufficient to form a core, with a higher oxide of tungsten, heating the mixture in an oxidizing atmosphere to a temperature within the range of from 600 to 700° C. to melt the base metal and oxidize its outer surface without sintering the oxide, and then reducing the oxide to a lower blue oxide of tungsten in an atmosphere of a suitable reducing agent.

4. A dehydrative catalyst comprising a core of base metal selected from the group consisting of aluminum, magnesium and zinc, the outer surface of said core being oxidized and fused to and thinly coated by a partially reduced oxide, selected from the higher oxides of the elements of family A of the sixth group of the periodic system, said base metal constituting the major proportion of the catalyst, and said catalyst being in the form of particles which pour freely and maintain their original shape.

5. A dehydrative catalyst comprising a core of aluminum, the outer surface of said core being oxidized and fused to and thinly coated by a partially reduced oxide, selected from the higher oxides of the elements of family A of the sixth group of the periodic system, said base metal constituting the major proportion of the catalyst, and said catalyst being in the form of particles which pour freely and maintain their original shape.

6. A dehydrative catalyst comprising a core of aluminum, the outer surface of said core being oxidized and fused to and thinly coated by a blue oxide of tungsten, said core metal constituting the major proportion of the catalyst, and said catalyst being in the form of particles which pour freely and maintain their original shape.

HARRY MILLER.